(No Model.)

T. S. C. LOWE.
APPARATUS FOR MANUFACTURE OF WATER GAS.

No. 542,566.

5 Sheets—Sheet 1.

Patented July 9, 1895.

Witnesses.
Robert Garrett,
Geo. W. Rea.

Inventor.
Thaddeus S. C. Lowe.
By James L. Norris.
Atty (No Model.) 5 Sheets—Sheet 2.

T. S. C. LOWE.
APPARATUS FOR MANUFACTURE OF WATER GAS.

No. 542,566. Patented July 9, 1895.

Witnesses.
Robt. Everett.
Geo. W. Rea.

Inventor:
Thaddeus S. C. Lowe.
By James L. Norris,
Atty.

(No Model.) 5 Sheets—Sheet 3.
T. S. C. LOWE.
APPARATUS FOR MANUFACTURE OF WATER GAS.
No. 542,566. Patented July 9, 1895.
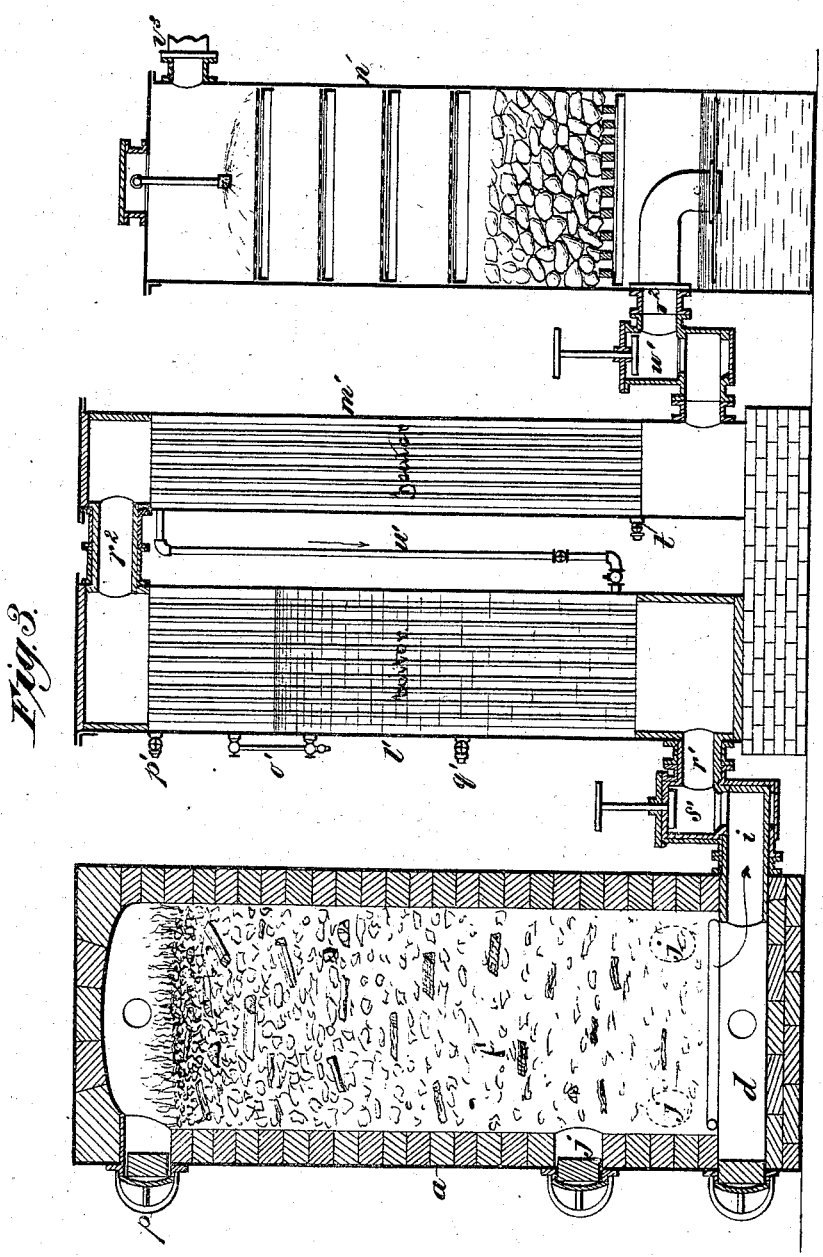
Witnesses:
Robert Everett,
Geo. H. Rea
Inventor:
Thaddeus S. C. Lowe.
By James L. Norris.
Atty.

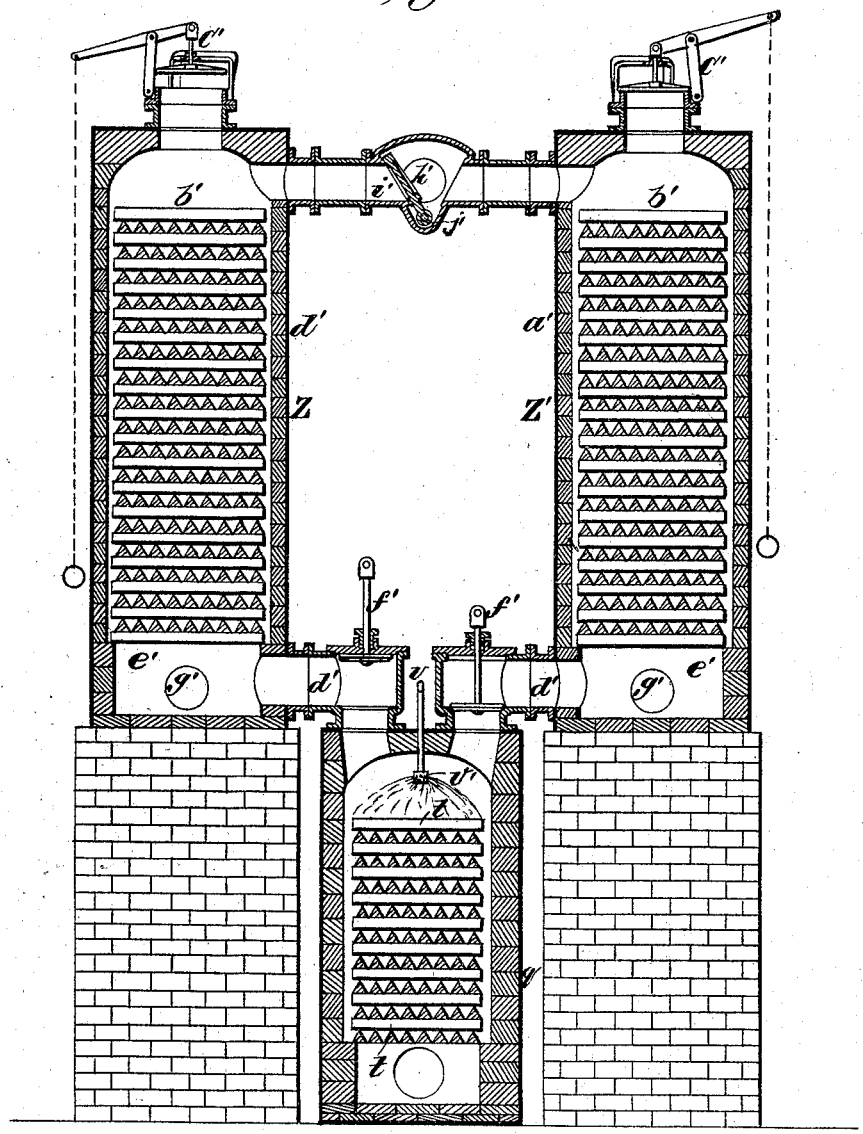

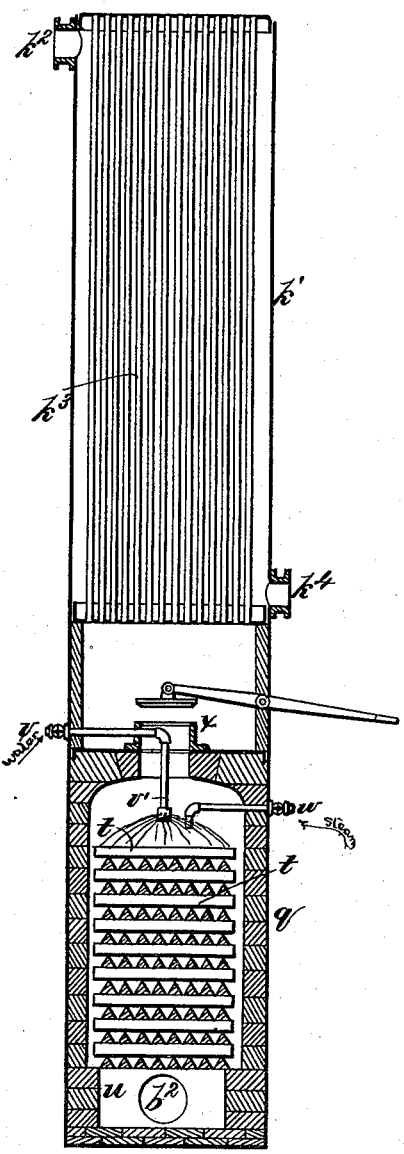

UNITED STATES PATENT OFFICE.

THADDEUS S. C. LOWE, OF NORRISTOWN, ASSIGNOR TO THE GUARANTEE TRUST AND SAFE DEPOSIT COMPANY, TRUSTEE, OF PHILADELPHIA, PENNSYLVANIA.

APPARATUS FOR MANUFACTURE OF WATER-GAS.

SPECIFICATION forming part of Letters Patent No. 542,566, dated July 9, 1895.

Application filed November 28, 1888. Serial No. 292,112. (No model.)

*To all whom it may concern:*

Be it known that I, THADDEUS S. C. LOWE, a citizen of the United States, residing at Norristown, in the county of Montgomery and State of Pennsylvania, have invented new and useful Improvements in Apparatus for the Manufacture of Water-Gas, of which the following is a specification.

This invention relates to a simple and efficient apparatus adapted for the use of bituminous coal, coal-slack, wood, coke, or breeze, or a mixture of two or more of these materials, in the production of non-illuminating heating-gas from coal and steam, with great economy of heat.

Figure 1:
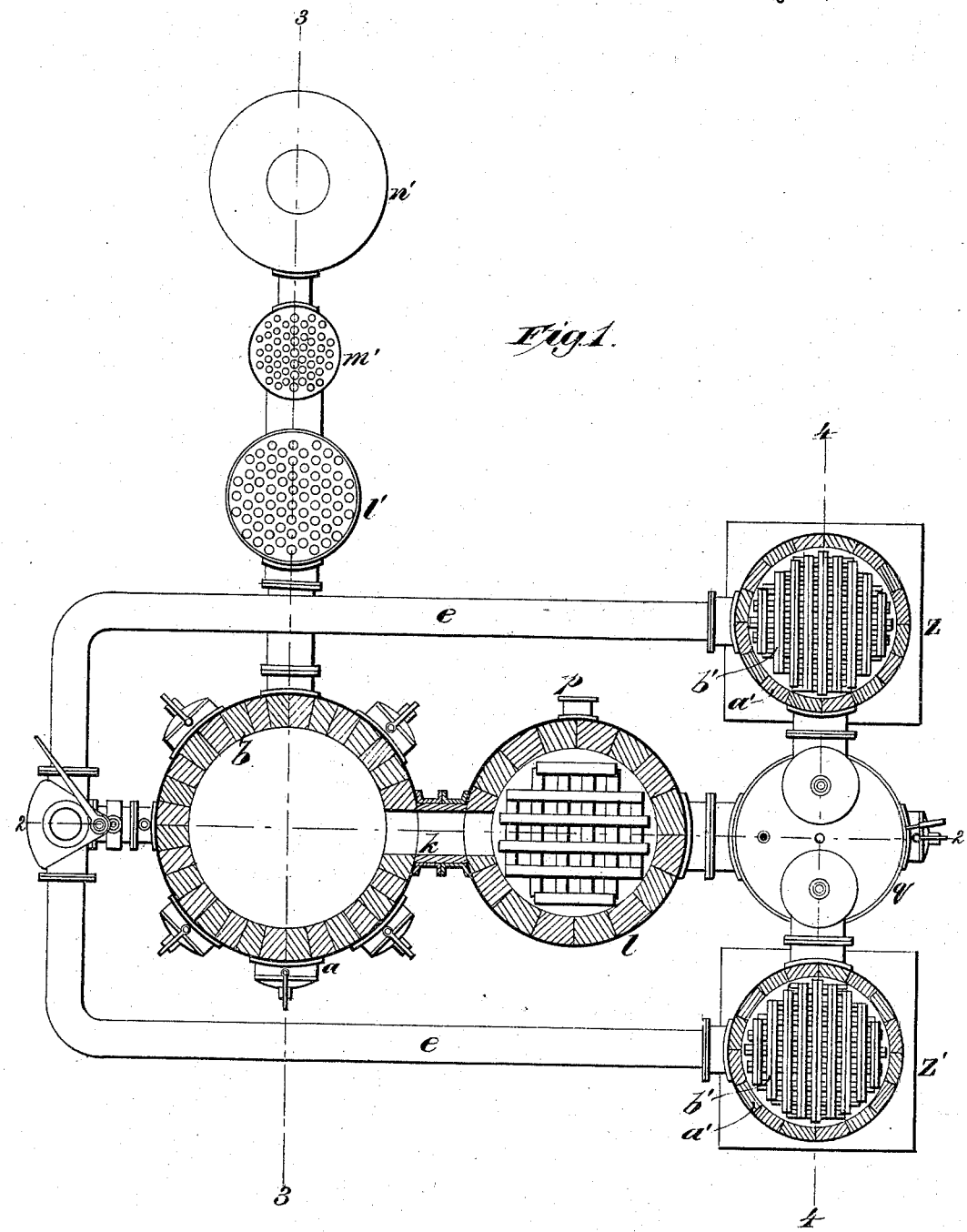
Figure 2:
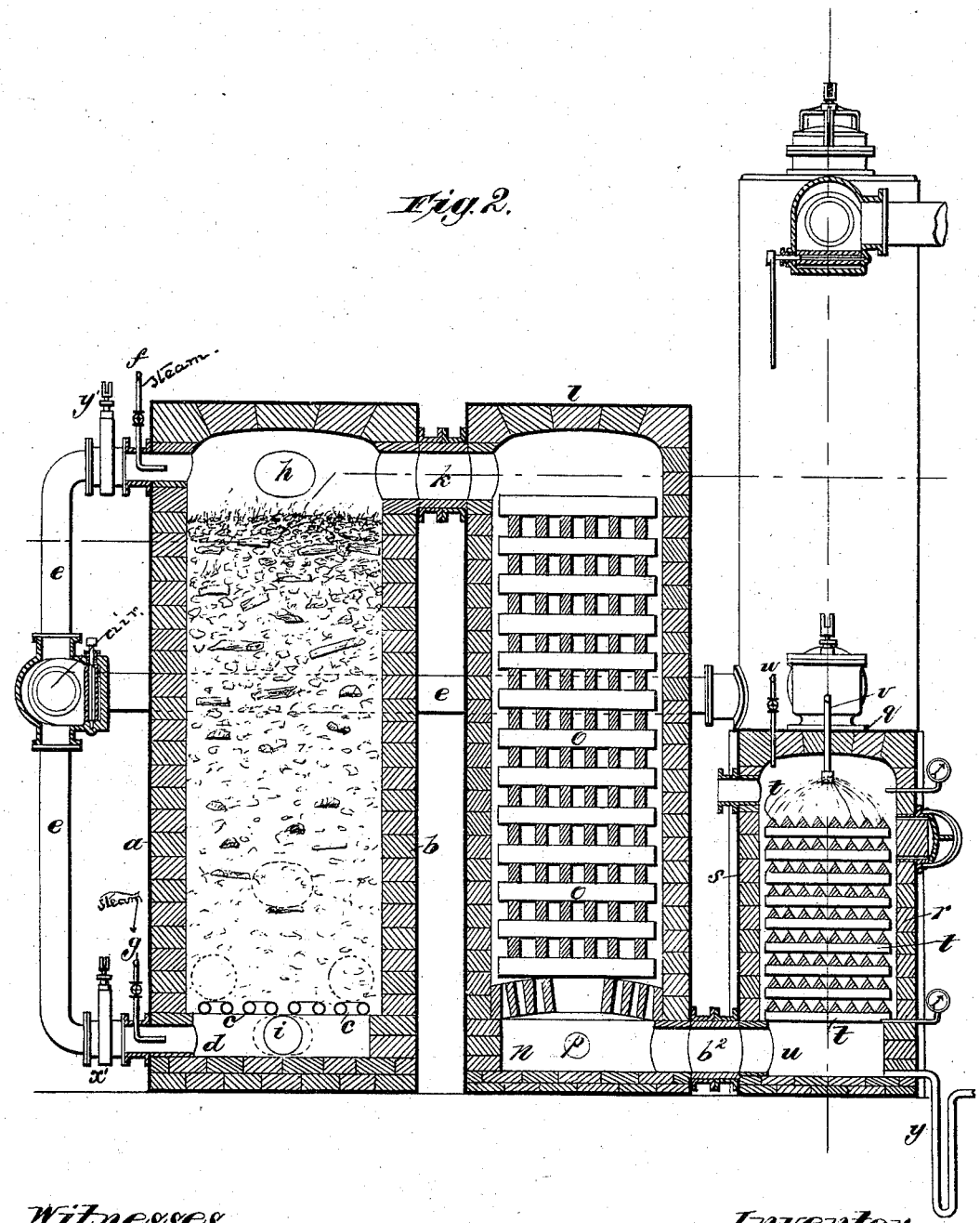

In the annexed drawings, Figure 1 is a sectional plan of a complete gas-making apparatus embodying my improvements. Fig. 2 is a vertical section of the same on the line 2 2 of Fig. 1. Fig. 3 is a vertical section of the same on the line 3 3 of Fig. 1. Fig. 4 is a vertical section of the same on the line 4 4 of Fig. 1. Fig. 5 is a vertical section of a steam-generator and a tubular air-heater arranged directly over said generator.

The letter $a$ designates a gas-generator, which consists of an upright iron shell lined with refractory materials, preferably fire-bricks $b$. In the lower part of this gas-generator is placed a series of water grate bars $c$ or a perforated arch of fire-bricks above an ash-pit $d$, and hot air is supplied to this generator through valved hot-blast pipes $e$, as hereinafter explained.

The gas-generator, as shown in Fig. 2, is provided with steam-induction pipes $f$ $g$, a door $h$ through which fuel is supplied, a flue $i$ for the exit of hot gases, clinker-holes $j$, and a flue $k$, which connects with a superheater $l$, located adjacent to the said gas-generator.

The superheater $l$ consists of an upright iron shell lined with refractory materials, preferably fire-bricks, and is provided with a perforated arch $m$, Fig. 2, of fire-bricks, over a flue-chamber $n$, located in the lower part of said superheater. In the superheater $l$ is an open-work structure of loosely-piled fire-bricks $o$ or other refractory materials. The chamber $n$ in the lower part of the superheater $l$ has an exit $p$ for oxidized gases.

The superheater $l$ communicates with a separate steam-generator $q$, consisting of an iron shell lined with refractory materials, such as asbestos bricks $r$, Fig. 2, sheathed with metal plating $s$ to prevent the absorption of moisture by the brick lining.

In the steam-generator $q$ is located an open-work structure of metal bars $t$, such as iron or steel, loosely piled over a flue-chamber $u$, which communicates by a pipe $b^2$ with the flue-chamber $n$ of the superheater.

The steam-generator $q$ is provided with a water-induction pipe $v$, terminating in the upper part of the generator with a spray-nozzle $v'$ for sprinkling water over the heated metal bars $t$, and it may also have a steam-induction pipe $w$ for a similar purpose. At the upper part of the steam-generator $q$ is an exit-pipe $x$ for oxidized gases, and at its lower part is a trapped pipe $y$ for carrying off any surplus water that may collect in the flue-chamber $u$.

Adjacent to the steam-generator $q$ are two stoves $z$ $z'$, consisting of iron shells lined with good non-conducting materials, such as ordinary clay or asbestos brick $a'$, as shown in Figs. 1 and 4. In each of these stoves is an open-work pile of heat-absorbing materials, preferably metal bars $b'$, such as iron or steel, loosely piled. Each stove is provided with a chimney-damper $c'$ at the top, and the lower part of said stove is provided with a flue $d'$, leading from a flue-chamber $e'$ to the upper part of the steam-generator. The flues $d'$ are provided with valves $f'$, and the chambers $e'$ have exits $g'$ for the passage of hot air from the stoves to the gas-generator $a$ through the hot-blast pipes $e$, as shown in Fig. 1. A cold-air inlet $h'$ communicates with the upper portions of both stoves $z$ $z'$ and is controlled by a shifting damper or valve $i'$, worked by a lever $j'$, for directing a cold-air blast alternately to one stove or the other, as desired.

A tubular air-heater $k'$, Fig. 5, may be placed directly over the steam-generator $q$ to take the place of the heating-stoves $z$ $z'$ when a more direct draft is desired or when ground-space is limited.

$l'$, Fig. 3, is an ordinary upright tubular steam-boiler.

$m'$ is a water-heater of like construction.

$n'$ is a gas purifier, cleaner, or washer.

$o'$ is a water-gage on the tubular boiler.

$p'$ is an exit for steam from the boiler.

$q'$ is an exit for hot water from the boiler and is intended to be connected with the pipe $v$, Figs. 2 and 5, which opens into the steam-generator $q$, above the metal bars $t$, piled therein.

$r'$, Fig. 3, is a flue connecting the flue $i$ of the gas-generator $a$ with the steam-boiler $l'$.

$s'$ is a valve in the flue $r'$.

$t'$ is an inlet-pipe for supplying cold water to the heater $m'$.

$u'$ is a pipe for carrying heated water from the heater $m'$ to the boiler $l'$.

$v^2$ is a flue connecting the water-heater $m'$ with the gas-cleaner $n'$, and $w$ is a valve in said flue.

In order to put the apparatus into operation a fire is built in the generator $a$ and fuel gradually introduced until the generator is charged up to near the level of the door $h$, the fuel employed at the start being preferably coke, anthracite coal, or wood. When this fuel has become sufficiently hot to throw off a combustible gas, known as "generator-gas," I admit a current of atmospheric air through the valve $x'$ of the pipe $e$ to the bottom of the generator and another current of air through the valve $y'$, Fig. 2, at the top of the generator for the purpose of burning this generator-gas above and as the same arises from the fuel in the generator. This has the effect of heating the fire-brick arch or closed top of the generator, by which top the heat is reverberated upon the fuel with great intensity. The products of this combustion, in a highly-heated condition, now pass through the flue $k$ into the top of the superheater $l$, (see Fig. 2,) down through the open pile of bricks $o$, depositing the greater portion of heat in said bricks, and (still containing a large amount of heat) pass on through the arch $m$ and the flue $b^2$ into the chamber $u$ of the steam-generator $q$, up through the open pile of metal bars $t$, (heating these bars sufficiently to generate large volumes of steam from the water sprayed on said bars,) and thence through one of the valves $f'$, Fig. 4, into one of the heating-stoves $z$ $z'$, and continuing on up through the heat-absorbing materials contained in such stove, imparting any remaining heat to these materials, and escaping finally through one of the dampers $c'$ into the open air. When the fuel in the generator $a$ has become sufficiently heated and the heat-absorbing materials in the superheater $l$ and the steam-generator $q$ have also been heated, as described, sufficiently for their respective purposes, I close the air-blast valves $x'$ and $y'$, as well as the open one of the valves $f'$ controlling the passage from the steam-generator to the proper heating-stove, and I then spray water through the nozzle $v'$ over the heated metal bars $t$ in the steam-generator.

This water is immediately converted into steam, which passes from the bottom of the steam-generator $q$, through the flue $b^2$, to the base of the superheater $l$ and up through the pile of bricks $o$ contained therein, through the flue $k$ into the top of the gas-generator $a$, and, passing down through the highly-heated carbon contained in the generator, is decomposed into its elementary gases. These gases come in contact with the hottest part of the carbon just before leaving the generator, and they therefore contain a large amount of heat, which, for the more economical working of the process, it is necessary to utilize. With this view I cause the same to pass from the base of the generator $a$ through the flues $i$ $r'$, Fig. 3, into and up through the tubes of the boiler $l'$, whence they pass through the flue $r^2$ down through the tubes of the water-heater $m'$, and thence through the flue $v^2$ into the cleaner $n'$, and thence through the flue $v^3$ to a purifier or a place of storage or consumption. After awhile the apparatus and the fuel in the generator $a$ become too cool to properly decompose steam. I then shut off the water coming through pipe $v$ into the steam-generator $q$, and in case steam is being admitted through the pipe $w$ I also shut off this steam, and I open the passage from the steam-generator $q$ to one of the stoves $z$ $z'$ by opening the proper one of the two valves $f'$ and the proper one of the two dampers $c'$. I also open the charging-door $h$ of the gas-generator $a$. I now find that the arched or closed top of the generator $a$, as well as the fuel in the generator, are quite hot. I then preferably introduce into the generator $a$ wood, fine or coarse, or coke sufficient to form a thin layer, and on top of this I place a thicker layer of bituminous coal. The object of thus charging these different materials in layers is to prevent the caking and melting coals from running too much into one mass. I have found that the wood or coke, and more particularly the wood, being consumed faster than the coal, leaves or occasions loose openings in the mass for the passage of gas, air, or steam. When wood or coke is not convenient for the above purpose, a layer of anthracite coal may be substituted.

After charging the gas-generator with fuel I close the door $h$ and admit atmospheric air at the bottom and top of the generator, as before described. The hot blast arising through the fuel has the effect of coking the under side of the fresh layer of bituminous coal and carrying the gases arising from the fuel into contact with the air-blast at the top of the generator, where they are inflamed. The heat from the flames is reverberated upon the coals and soon reduces the whole charge of bituminous coal to coke. The resulting gases are burned and the heat thus produced is utilized in heating the fire-bricks $o$ in the superheater and the metal bars $t$ in the steam-generator, as above described. The whole apparatus, as well as the fuel in the generator, are thus again made ready for the production of water-gas.

It is to be understood that in the successive heating the products of combustion from the gas-generator $a$, after leaving the steam-generator $q$, are caused to pass out through the stoves $z$ $z'$ and that the atmospheric air to support combustion in the generator $a$ is forced in through said stoves alternately.

The passage of the highly-heated steam down through the newly-made coke and the alternate quickening of the fire by passing atmospheric air through the same have a tendency to keep the coke open and cause it to settle gradually as its lower strata burn away.

There are many kinds of bituminous coal that will work sufficiently well without the use of the above-mentioned mixture of wood and coke or anthracite, inasmuch as the top portion of the coal in the generator will always be hot, well coked, and somewhat loose from the effect of the highly-heated steam passed over and through it in the operation of making water-gas, and if the raw bituminous coal is introduced after every or nearly every charge of gas the layers of coal required to keep up the supply in the generator will not have to be so thick but that the effect of the upward passage of the generator-gas and the reverberated heat occasioned by the burning of the gas from the freshly-charged coal will sufficiently coke the whole charge. Thus the coking process and the making of water-gas by the use of bituminous coal can go on together without interruption from the packing and caking, which would occur if such coal were used in the ordinary way in generators of ordinary construction.

By generating steam in the boiler $l'$ and heating the feed-water $m'$, as described, three processes are effected, viz: The outgoing water-gases are cooled on their way to the cleaner, the heat abstracted from these gases generates steam in the boiler $l'$ and heats the feed-water in the heater $m'$, and at the same time, because the heat is applied from the top toward the bottom, precipitates impurities in the water to the lower portion of the water-heater, from which they are occasionally blown off and thus prevented from entering the boiler $l'$ with the feed-water. The steam generated in the boiler $l'$ may be conveyed directly to the steam-generator $q$ through pipes $p'$ $w$ or to the lower part of the superheater $l$, either directly or after it has performed duty in driving machinery, and, if sufficient for the apparatus, may be used alone, or, if not sufficient, may be used in conjunction with the spray of water delivered through the nozzle $v'$, which water also, for economy, is preferably taken from the boiler $l'$.

By constructing the steam-generator $q$ of a separate chamber containing metal bars $t$, as shown, I am enabled to use water more freely than when the metal bars are placed immediately over fire-bricks for superheating both in one chamber, and should any excess of water be thus introduced the same will pass off through the trapped pipe $y$.

The advantage of elevating the heating-stoves $z$ $z'$ above the steam-generator $q$, as shown in Fig. 4, consists in this, that the draft being then more direct than in the apparatus described in my previous applications heat may be gotten up by natural draft when desired.

Anthracite coal, wood, or coke may be used in this apparatus as fuel instead of bituminous coal whenever those materials can be obtained more cheaply or economically.

When a more direct draft, either natural or forced, is desired, I employ, instead of the two hot-blast stoves $z$ and $z'$, one tubular stack or air-heater $k'$, which I prefer to place directly over the steam-generator $q$, as shown in Fig. 5, although it may be placed adjacent to and connected with the steam-generator by a flue. In this case the cold air required to support combustion in the generator is forced in through an aperture $k^2$ in the top of the shell $k'$, inclosing the tubes $k^3$, and is conducted off through an aperture $k^4$ at the lower end of the heater and thence through a flue (not shown) to the generator $a$, while the products of combustion arising from the steam-generator $q$ pass up through the tubes $k^3$ and impart their heat to the incoming atmospheric air passing in an opposite direction around said tubes.

When it is desired to convert the carbonic-oxide portion of the water-gases, or any portion of said carbonic oxide, into carbonic acid, I admit steam, preferably highly heated, into the apparatus in such a manner as to mix the steam with the gases after they have left the fuel in the generator, preferring to admit the same into the top of the generator through the steam-pipe $f$, although this extra steam may be admitted at any point between the generator $a$ and the superheater $l$ or directly into the superheater in such a manner that the united gases and steam are brought into contact with the highly-heated brick-work in the superheater. This procedure has the effect of oxidizing the carbonic portion of the gases, after which the same can be carried off either through the opening $p$ or preferably through the opening $x$ of the steam-generator $q$, after depositing a portion of their heat in the metal bars $t$. The gases are then passed to the purifiers, (such as are usually employed in gas-works,) where the carbonic acid and other impurities are extracted. Thus it will be seen that water-gas containing carbonic oxide, due to the amount of steam decomposed, and water-gas, divested of carbonic oxide may be produced by the same apparatus.

Heretofore when water-gas has been made by passing the steam from the top of the generator down through the fuel, causing the resulting gases to pass into the base or ash-pit of the generator, it has been customary to conduct these hot gases thence directly into a water seal to prevent their return, and thus obviate any liability on their part to mingle with the atmospheric air of combustion while restoring the heat in the generator. This procedure has occasioned the loss of considerable heat. To prevent this loss I employ a valve $s'$, Fig. 3, constructed of or lined or covered with materials sufficiently refractory to resist the high heat contained in the gases. This valve when constructed as shown acts automatically, the pressure of the gas raising it, and its own weight causing it to return to its seat when the generation of gas ceases; but it can be made to work by hand or any other manner desired. By means of the valve $s'$ I am enabled to utilize the great heat contained in the gases in heating water, or in generating steam, or for any other purpose. The valve $w'$ is similar in construction to valve $s'$, but is not subjected to as much heat.

What I claim is—

1. In an apparatus for making water gas the combination of the gas generator $a$, the separate superheater $l$, having refractory material piled therein, a separate steam generator $q$, having metal bars $t$, openly piled therein, said generator being provided with water inlet $v$, and trapped water outlet $y$, the stoves $z$, $z'$, arranged above the level of the steam generator, flues for connecting the stoves, generators and superheater, and regulating valves, substantially as specified, whereby the outgoing products of combustion from said gas generator are caused to pass out through said stoves alternately and the inflowing blast of atmospheric air for sustaining combustion in said gas generator is caused to pass through said stoves alternately in the manner and for the purpose described.

2. In an apparatus for making water gas, the combination of the gas generator $a$, the separate superheater $l$, the separate steam generator $q$, the stoves $z$, $z'$, the flue $k$, connecting the gas generator and superheater at the top, the flue $b^2$, connecting the superheater and the steam generator at the bottom, the valved hot blast pipes $e$, communicating with the gas generator above and below the fuel, the tubular boiler $l'$, the water heater $m'$, the valved flues $i$, $r'$, connecting the gas generator and the tubular boiler at the bottom, the flue $r^2$, connecting the boiler and the water heater at the top the hot water pipe $u'$, connecting the upper part of the heater and the lower part of the boiler, the gas cleaner $n'$, and the valved flue connecting the heater $m'$ and cleaner $n'$, substantially as described.

In testimony whereof I affix my signature in presence of two witnesses.

THADDEUS S. C. LOWE.

Witnesses:
WALTER C. RODMAN,
RANDAL MORGAN.